(12) United States Patent
Dietrich

(10) Patent No.: US 12,342,759 B2
(45) Date of Patent: Jul. 1, 2025

(54) KNIFE BRUSH FOR A HEADER REEL

(71) Applicant: 101288550 Saskatchewan Ltd., Assiniboia (CA)

(72) Inventor: Dave Dietrich, Assiniboia (CA)

(73) Assignee: 101288550 Saskatchewan Ltd., Assiniboia (CA)

( * ) Notice: Subject to any disclaimer, the term of this patent is extended or adjusted under 35 U.S.C. 154(b) by 655 days.

(21) Appl. No.: 17/633,310

(22) PCT Filed: May 7, 2020

(86) PCT No.: PCT/CA2020/050625
§ 371 (c)(1),
(2) Date: Feb. 7, 2022

(87) PCT Pub. No.: WO2021/026635
PCT Pub. Date: Feb. 18, 2021

(65) Prior Publication Data
US 2022/0354057 A1  Nov. 10, 2022

(30) Foreign Application Priority Data

Aug. 9, 2019  (CA) ...................................... 3051641

(51) Int. Cl.
*A01D 57/02* (2006.01)
(52) U.S. Cl.
CPC .................... *A01D 57/02* (2013.01)
(58) Field of Classification Search
CPC ........ A01D 57/02; A01D 57/12; A01D 57/01; A01D 45/003; A01D 45/22
See application file for complete search history.

(56) References Cited

U.S. PATENT DOCUMENTS

| 2,270,646 | A | * | 1/1942 | Campbell | .............. | A01D 34/02 56/5 |
| 3,126,693 | A | * | 3/1964 | Renn | .................... | A01D 89/002 172/705 |
| 4,038,810 | A | | 8/1977 | Williams et al. | | |
| 4,398,384 | A | | 8/1983 | Klinner | | |

(Continued)

FOREIGN PATENT DOCUMENTS

| CN | 101236773 | 8/2008 |
| CN | 105052359 | 11/2015 |

(Continued)

OTHER PUBLICATIONS

Zyla et al., "Development of a new crop lifter for direct cut harvesting dry bean," Canadian Biosystem Engineering, 2002, (44)2.9-2.14.

(Continued)

*Primary Examiner* — Christopher J Sebesta
*Assistant Examiner* — Robert E Pezzuto
(74) *Attorney, Agent, or Firm* — Craig J. Lervick; Larkin Hoffman; Daly & Lindgren, Ltd.

(57) ABSTRACT

A sweeping apparatus for a reel of a combine comprises a plurality of brush assemblies, each brush assembly comprising a plurality of flexible bristles attached to a selected contact member of the reel and extending outward from the outer edge of the selected contact member such that as the selected contact member passes over the knife, the bristles extend down between the knife guards.

20 Claims, 3 Drawing Sheets

(56) References Cited

U.S. PATENT DOCUMENTS

| | | | |
|---|---|---|---|
| 5,809,759 | A | 9/1998 | Zyla et al. |
| 6,691,499 | B2 | 2/2004 | Schumacher et al. |
| 9,894,841 | B2 | 2/2018 | Schrattenecker |
| 2006/0053635 | A1 | 3/2006 | Legrand |
| 2014/0283494 | A1 | 9/2014 | Schrattenecker |
| 2018/0249633 | A1 | 9/2018 | Dietrich |

FOREIGN PATENT DOCUMENTS

| | | |
|---|---|---|
| CN | 204860132 | 12/2015 |
| CN | 106717554 | 5/2017 |
| CN | 108316214 | 7/2018 |
| CN | 108633484 | 10/2018 |
| CN | 208128909 | 11/2018 |
| FR | 2487159 | 1/1982 |
| GB | 2088686 | 6/1982 |
| JP | 2013111009 | 6/2013 |
| JP | 5861948 | 2/2016 |
| WO | WO2015184496 | 12/2015 |
| WO | WO2017041177 | 3/2017 |

OTHER PUBLICATIONS

International Search Report and Written Opinion in International Application No. PCT/CA2020/050625, dated Jul. 22, 2022, 12 pages.

\* cited by examiner

KNIFE BRUSH FOR A HEADER REEL

This disclosure relates to the field of agricultural implements and in particular a brush for a header reel configured to sweep material off the knife onto the header table.

BACKGROUND

Header reels for agricultural combines are of two basic types. Bat reels have horizontally oriented flat boards mounted on arms extending radially from a center shaft, and the boards contact the plants above the knife and move same into the knife where the plants are cut and then the boards carry the cut plants onto the header table and into the harvesting mechanism of the combine.

Finger reels, such as disclosed in U.S. Pat. No. 9,894,841 to Schrattenecker, have horizontally oriented finger shafts mounted on arms extending radially from a center shaft, and fingers extending radially from the finger shaft that extend downward into the plants and similarly sweep the plants into the knife and then onto the header table. The fingers are configured to move with respect to the finger shaft as the reel rotates so that the fingers move the plants rearward and then the fingers move upward so the plants drop onto the header.

Short crops such as lentils and soybeans present difficulties during harvest. While the plants may be cut by the header knife they are often too short to make good contact with the reel of the header and so hang up on the knife and often fall to the ground instead of being moved on to the header table and harvested. Shattering losses also occur where the plants experience considerable vibration and seeds fall from the plant while bunching on the knife before moving onto the table. Losses in this manner can be considerable.

U.S. Pat. No. 4,038,810 to Williams et al. discloses series of flaps fastened along the fingers such that a bottom edge of the flap drags against the top of the guards of the knife to sweep material onto the header and prevent same from falling onto the ground, and also to reduce shattering losses. This flap does not work well however when the header has crop lifters attached along the knife, such as disclosed in U.S. Pat. No. 6,691,499 to Schumacher, et al. as the flap rides along the top of the crop lifter and does not reach the material gathered on the knife guards.

SUMMARY OF THE INVENTION

The present disclosure provides a header reel apparatus that overcomes problems in the prior art.

In a first embodiment the present disclosure provides a sweeping apparatus for a reel of a combine header mounted on a front end of a combine for travel in a forward operating travel direction to cut plant stalks, wherein the combine header comprises knife guards spaced along a forward edge of a table of the combine header and a knife extending along the forward edge of the table through slots in the knife guards; wherein the reel comprises a center shaft rotatably mounted at each end thereof to the combine header, a plurality of contact members mounted to the center shaft in a horizontal orientation radially spaced from the center shaft, and a drive operative to rotate the center shaft such that the contact members below the center shaft move in a rearward direction toward the combine header with outer edges of the contact members above the knife guards as the contact members pass over the knife when the reel is in a lowest position. The apparatus comprises a plurality of brush assemblies, each brush assembly comprising a plurality of flexible bristles attached to a selected contact member and extending outward from the outer edge of the selected contact member such that as the selected contact member passes over the knife, the bristles extend down between the knife guards.

In a second embodiment the present disclosure provides a sweeping reel apparatus for a combine header mounted on a front end of a combine for travel in a forward operating travel direction to cut plant stalks, wherein the combine header comprises knife guards spaced along a forward edge of a table of the combine header and a knife extending along the forward edge of the table through slots in the knife guards. The apparatus comprises a reel comprising a center shaft rotatably mounted at each end thereof to the combine header, and a plurality of contact members mounted to the center shaft in a horizontal orientation radially spaced from the center shaft. A drive is operative to rotate the center shaft such that the contact members below the center shaft move in a rearward direction toward the combine header with outer edges of the contact members above the knife guards as the contact members pass over the knife when the reel is in a lowest position. Each of a plurality of brush assemblies comprises a plurality of flexible bristles attached to a selected contact member and extending outward from the outer edge of the selected contact member such that as the selected contact member passes over the knife, the bristles extend down between the knife guards.

The bristles of the brush assemblies extend down between the knife guards to sweep material lodged between the knife guards rearward onto the table of the header where same can be carried into the threshing mechanism of the combine.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
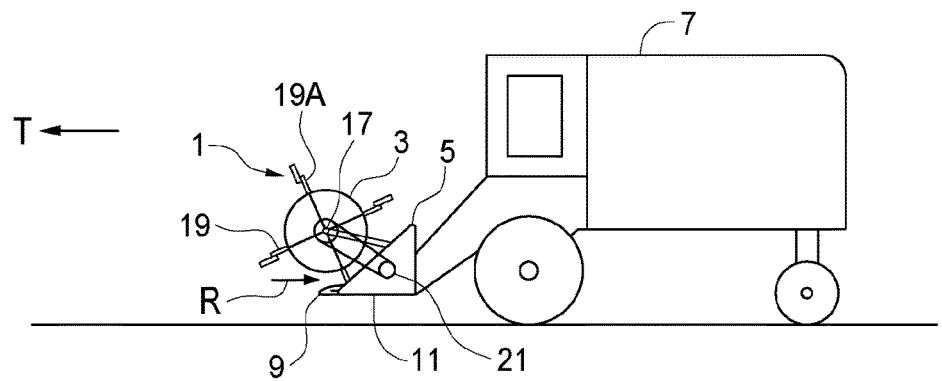
FIG. 1 is a schematic side view of an embodiment of the apparatus of the present disclosure mounted on a combine header.
Figure 2:
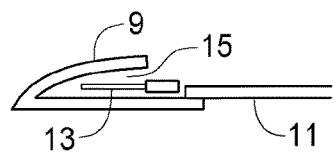
FIG. 2 is a schematic side view showing a prior art knife and knife guards mounted on a header table.
Figure 3:
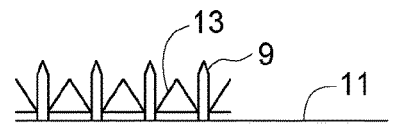
FIG. 3 is a schematic top view showing the prior art knife of FIG. 2.

FIG. 1 illustrates an embodiment of a sweeping apparatus 1 of the present for the reel 3 of a combine header 5 mounted on a front end of a combine 7 for travel in a forward operating travel direction T to cut plant stalks of a field crop. As shown in FIGS. 2 and 3 the combine header 5 comprises knife guards 9 spaced along a forward edge of a table 11 of the combine header and a knife 13 extending along the forward edge of the table 11 through slots 15 in the knife guards 9.

The reel 3 comprises a center shaft 17 rotatably mounted at each end thereof to the combine header 5 and a plurality of contact members 19 mounted to the center shaft 17 in a horizontal orientation radially spaced from the center shaft 17. A drive 21 is operative to rotate the center shaft 17 such that the contact members 19 below the center shaft 17 move in a rearward direction R toward the combine header 5 with outer edges 19A of the contact members 19 above the knife guards 9 as the contact members 19 pass over the knife 13 when the reel 3 is in a lowest position.

Figure 5:
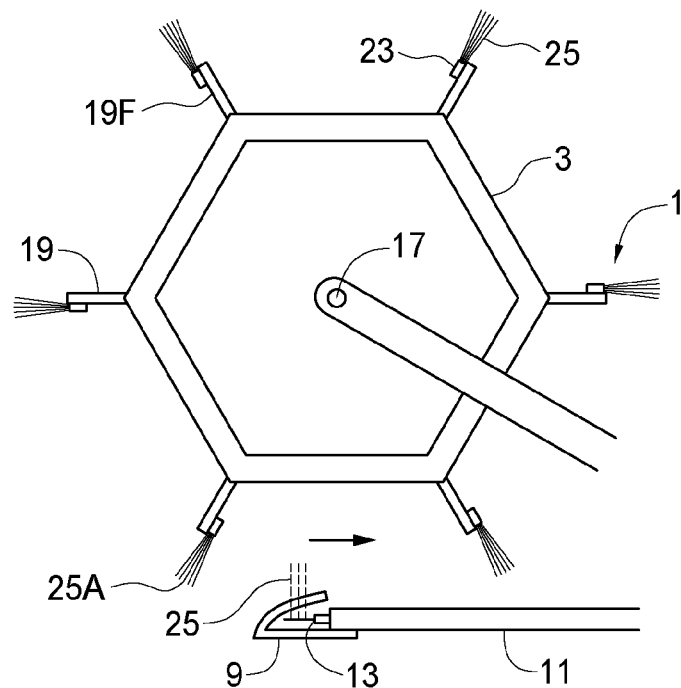
FIG. 5 is a schematic side view of the embodiment of FIG. 1 mounted on a conventional bat reel on a combine header.
Figure 6:
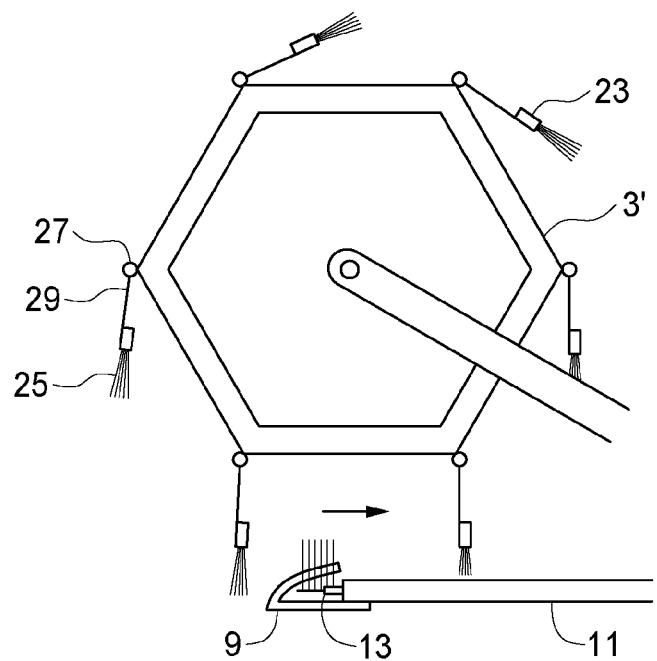
FIG. 6 is a schematic side view of an alternate embodiment of an apparatus of the present disclosure mounted on a pickup reel on a combine header.

The apparatus 1, as best seen in FIGS. 5 and 6, comprises a plurality of brush assemblies 23 attached to the contact members 19. Each brush assembly comprising a plurality of flexible bristles 25 attached to a selected contact member 19 and extending outward from the outer edge 19A of the selected contact member 19 such that as the selected contact member 19 passes over the knife 13, the bristles 25 extend down between the knife guards 9. When the bristles 25 extend down between the knife guards 9, ends 25A of the bristles 25 are above the knife 13.

In FIGS. 1 and 5, the reel 3 is a conventional bat reel where the contact members 19 are each provided by a rigid blade with blade faces 19F oriented substantially radially with respect to the center shaft 17 and wherein the brush assemblies 23 are attached to the blade faces 19F such that the flexible bristles 25 extend substantially radially from the center shaft.

Figure 4:
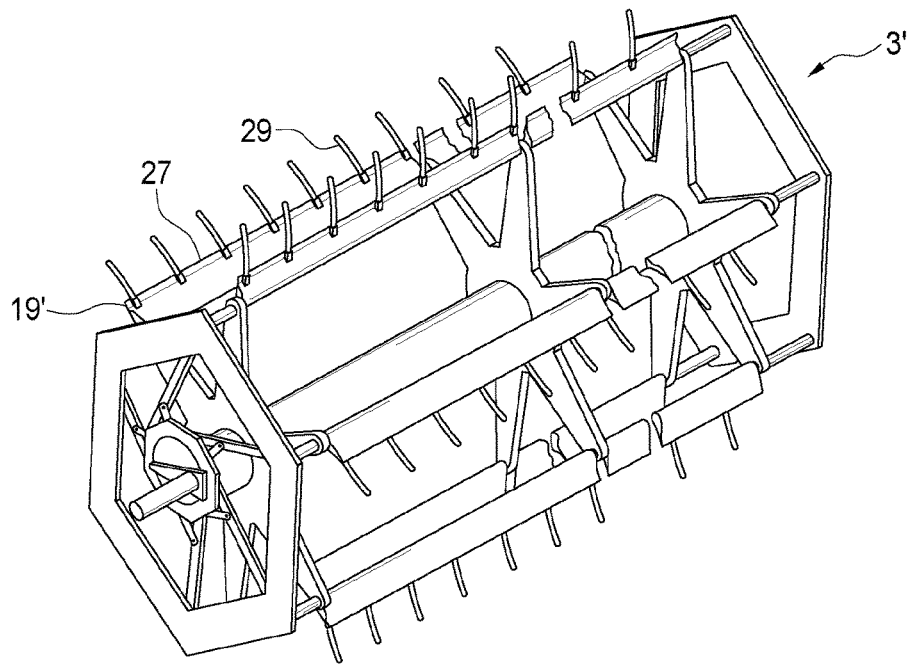
FIG. 4 is a schematic perspective view of a pickup reel of the prior art.

FIG. 4 schematically illustrates a finger type pickup reel 3' as is known in the art, where each contact member 19' comprises a horizontal finger tube 27 with fingers 29 mounted to the finger tubes 27. As shown in FIG. 6, the brush assemblies 23 are attached to the contact member 19' such that the flexible bristles 25 extend substantially parallel to the fingers 29 and outward from the fingers.

Figure 7:
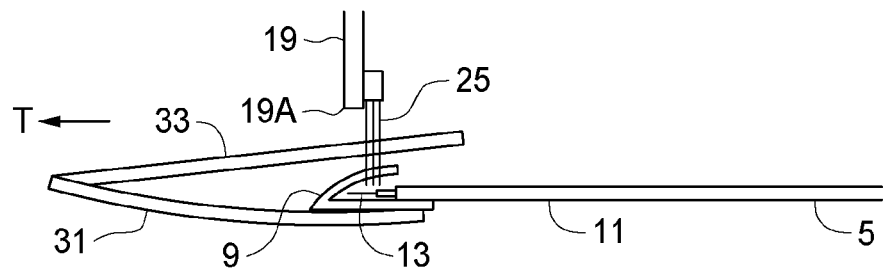
FIG. 7 is a schematic side view of the embodiment of FIG. 1 mounted on a header table that also has crop lifters mounted thereon.

FIG. 7 schematically illustrates a combine header 5 further comprises crop lifters 31 attached to the knife guards 9, with lifter fingers 33 extending above the knife guards 9 substantially in alignment with the operating travel direction T from a front end forward of the knife guards to a rear end above the table 11. The outer edges 19A of the contact members 19 pass above the lifter fingers 33 as the contact members 19 pass over the knife 13 when the reel is in the lowest position, and the flexible bristles 25 extend down between the lifter fingers 33.

Figure 8:
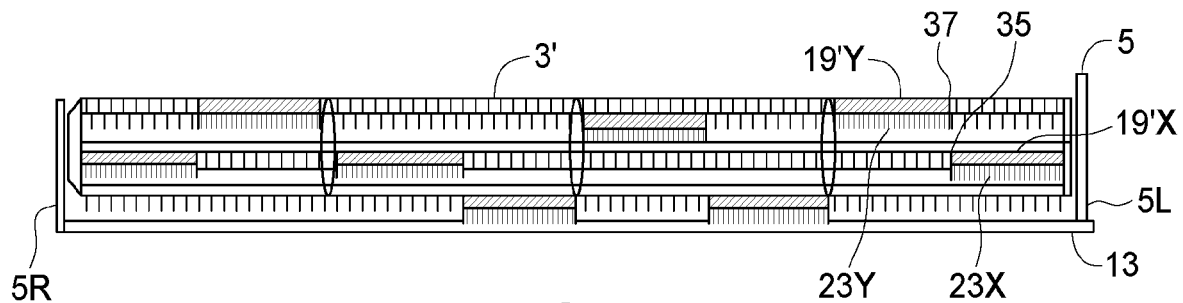
FIG. 8 is a schematic front view of a pickup reel mounted on a combine header and with a plurality of brush assemblies mounted on the contact members.

It is contemplated that brushing the knife guards 9 once or twice per reel revolution will keep the crop sufficiently swept off the knife guards 9. FIG. 8 schematically illustrates a pick up reel 3" reel where, in order e to balance the forces on the reel 3' each brush assembly 23 extends along a partial length of the attached contact member 19'.

A first contact member 19'X passes over the knife 13 followed by a second contact member 19'Y. A first brush assembly 23X extends along the first contact member 19'X from a left end 5L of the header 5 to a first brush end location 35 on the first contact member 19'X, and a second brush assembly 23Y extends along the second contact member 19'Y toward a right end 5R of the header 5 from a second brush end 37 substantially aligned with the first brush end location 35. The brush assemblies alternate along the different contact members 19' from the left end 5L to the right end 5R of the header 5.

Figure 9:
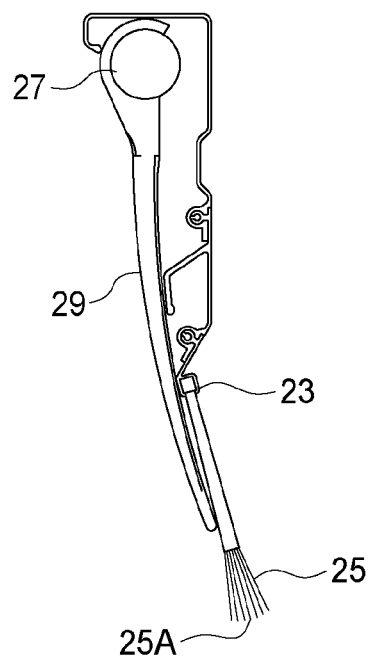
FIG. 9 is a schematic sectional view showing an arrangement for mounting a brush assembly on a fingers of a pickup reel.

FIG. 9 schematically illustrates a sectional side view of one arrangement for mounting a brush assembly 23 on the fingers 29 of a pickup reel.

The bristles 25 of the illustrated brush assemblies 23 extend down between the knife guards 9 to sweep material lodged between the knife guards 9 rearward onto the table 11 of the header where same can be carried into the threshing mechanism of the combine 7. The length of the bristles 25 is selected to end before the knife 13, however since this distance is quite small, the ends 25A bristles 25 may contact the knife and be cut on occasion, especially when travelling over rough terrain however the bristles can be replaced when they become too short to function effectively.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A sweeping apparatus for a reel of a combine header mounted on a front end of a combine for travel in a forward operating travel direction to cut plant stalks, wherein the combine header comprises knife guards spaced along a forward edge of a table of the combine header and a knife extending along the forward edge of the table through slots in the knife guards; wherein the reel comprises a center shaft rotatably mounted at each end thereof to the combine header, a plurality of contact members mounted to the center shaft in a horizontal orientation radially spaced from the center shaft, and a drive operative to rotate the center shaft such that the contact members below the center shaft move in a rearward direction toward the combine header with outer edges of the contact members above the knife guards as the contact members pass over the knife when the reel is in a lowest position, the apparatus comprising:

a plurality of brush assemblies, each brush assembly comprising a plurality of flexible bristles attached to a selected contact member and extending outward from the outer edge of the selected contact member such that as the selected contact member passes over the knife, the bristles extend down between the knife guards;

wherein each brush assembly extends along a partial length of the attached contact member and wherein a brushless space, with no brush attached, extends along each contact member between ends of the brush assemblies that are attached to the contact member;

wherein a first contact member passes over the knife followed by a second contact member; and wherein a first brush assembly extends along the first contact member from a left end of the header to a first brush end location on the first contact member, and a second brush assembly extends along the second contact member toward a right end of the header from a second brush end location substantially aligned in an axial direction with the first brush end location.

2. The apparatus of claim 1 wherein when the bristles extend down between the knife guards, and the ends of the bristles are above the knife.

3. The apparatus of claim 1 wherein the combine header further comprises crop lifters attached to the knife guards, with lifter fingers extending above the knife guards substantially in alignment with the operating travel direction from a front end forward of the knife guards to a rear end above the table, and wherein the outer edges of the contact members pass above the lifter fingers as the contact members pass over the knife when the reel is in a lowest position, and wherein the flexible bristles extend down between the lifter fingers.

4. The apparatus of claim 1 wherein the contact members are each provided by a rigid blade with blade faces oriented substantially radially with respect to the center shaft and wherein the brush assemblies are attached to the blade faces such that the flexible bristles extend substantially radially from the center shaft.

5. The apparatus of claim 1 wherein each contact member comprises a horizontal finger tube with fingers mounted to the finger tubes and wherein the brush assemblies are attached to the contact member such that the flexible bristles extend substantially parallel to the fingers.

6. The apparatus of claim 2 wherein the combine header further comprises crop lifters attached to the knife guards, with lifter fingers extending above the knife guards substantially in alignment with the operating travel direction from a front end forward of the knife guards to a rear end above the table, and wherein the outer edges of the contact members pass above the lifter fingers as the contact members pass over the knife when the reel is in a lowest position, and wherein the flexible bristles extend down between the lifter fingers.

7. The apparatus of claim 3 wherein the contact members are each provided by a rigid blade with blade faces oriented substantially radially with respect to the center shaft and wherein the brush assemblies are attached to the blade faces such that the flexible bristles extend substantially radially from the center shaft.

8. The apparatus of claim 7 wherein when the bristles extend down between the knife guards, and the ends of the bristles are above the knife.

9. The apparatus of claim 3 wherein each contact member comprises a horizontal finger tube with fingers mounted to the finger tubes and wherein the brush assemblies are attached to the contact member such that the flexible bristles extend substantially parallel to the fingers.

10. The apparatus of claim 9 wherein when the bristles extend down between the knife guards, and the ends of the bristles are above the knife.

11. A sweeping reel apparatus for a combine header mounted on a front end of a combine for travel in a forward operating travel direction to cut plant stalks, wherein the combine header comprises knife guards spaced along a forward edge of a table of the combine header and a knife extending along the forward edge of the table through slots in the knife guards, the apparatus comprising:
a reel comprising a center shaft rotatably mounted at each end thereof to the combine header, and a plurality of contact members mounted to the center shaft in a horizontal orientation radially spaced from the center shaft;
a drive operative to rotate the center shaft such that the contact members below the center shaft move in a rearward direction toward the combine header with outer edges of the contact members above the knife guards as the contact members pass over the knife when the reel is in a lowest position;
a plurality of brush assemblies, each brush assembly comprising a plurality of flexible bristles attached to a selected contact member and extending outward from the outer edge of the selected contact member such that as the selected contact member passes over the knife, the bristles extend down between the knife guards;
wherein each brush assembly extends along a partial length of the attached contact member; and wherein a brushless space, with no brush attached, extends along each contact member between ends of the brush assemblies that are attached to the contact member;
wherein a first contact member passes over the knife followed by a second contact member, and
wherein a first brush assembly extends along the first contact member from a right end of the header to a first brush end location on the first contact member, and a second brush assembly extends along the second contact member toward a left end of the header from a second brush end location substantially aligned in an axial direction with the first brush end location.

12. The apparatus of claim 11 wherein when the bristles extend down between the knife guards, ends of the bristles are above the knife.

13. The apparatus of claim 11 wherein the combine header further comprises crop lifters attached to the knife guards, with lifter fingers extending above the knife guards substantially in alignment with the operating travel direction from a front end forward of the knife guards to a rear end above the table, and wherein the outer edges of the contact members pass above the lifter fingers as the contact members pass over the knife when the reel is in a lowest position, and wherein the flexible bristles extend down between the lifter fingers.

14. The apparatus of claim 11 wherein the contact members are each provided by a rigid blade with blade faces oriented substantially radially with respect to the center shaft and wherein the brush assemblies are attached to the blade faces such that the flexible bristles extend substantially radially from the center shaft.

15. The apparatus of claim 11 wherein each contact member comprises a horizontal finger tube with fingers mounted to the finger tubes and wherein the brush assemblies are attached to the contact member such that the flexible bristles extend substantially parallel to the fingers.

16. The apparatus of claim 12 wherein the combine header further comprises crop lifters attached to the knife guards, with lifter fingers extending above the knife guards substantially in alignment with the operating travel direction from a front end forward of the knife guards to a rear end above the table, and wherein the outer edges of the contact members pass above the lifter fingers as the contact members pass over the knife when the reel is in a lowest position, and wherein the flexible bristles extend down between the lifter fingers.

17. The apparatus of claim 13 wherein the contact members are each provided by a rigid blade with blade faces oriented substantially radially with respect to the center shaft and wherein the brush assemblies are attached to the blade faces such that the flexible bristles extend substantially radially from the center shaft.

18. The apparatus of claim 17 wherein when the bristles extend down between the knife guards, and the ends of the bristles are above the knife.

19. The apparatus of claim 13 wherein each contact member comprises a horizontal finger tube with fingers mounted to the finger tubes and wherein the brush assemblies are attached to the contact member such that the flexible bristles extend substantially parallel to the fingers.

20. The apparatus of claim 19 wherein when the bristles extend down between the knife guards, and the ends of the bristles are above the knife.

\* \* \* \* \*